(Model.)
2 Sheets—Sheet 1.
P. P. HOGUE.
COMBINED EJECTOR AND INJECTOR.
No. 400,342.  Patented Mar. 26, 1889.
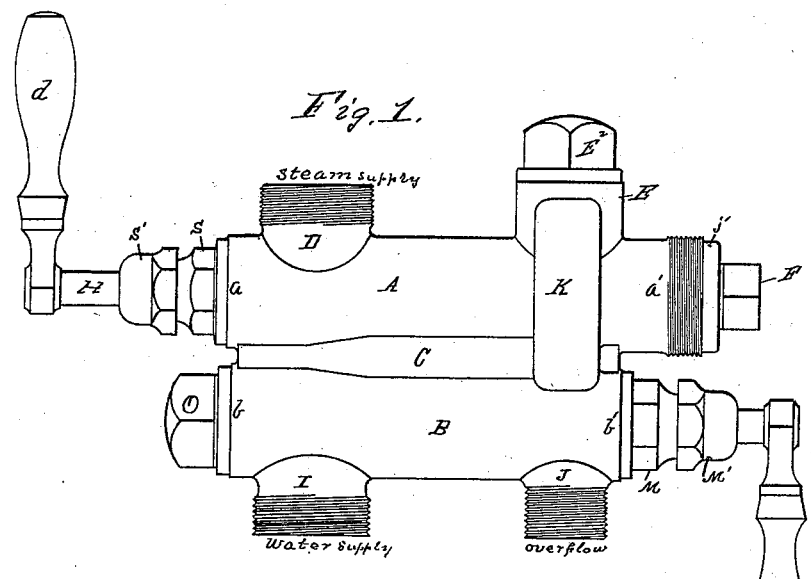
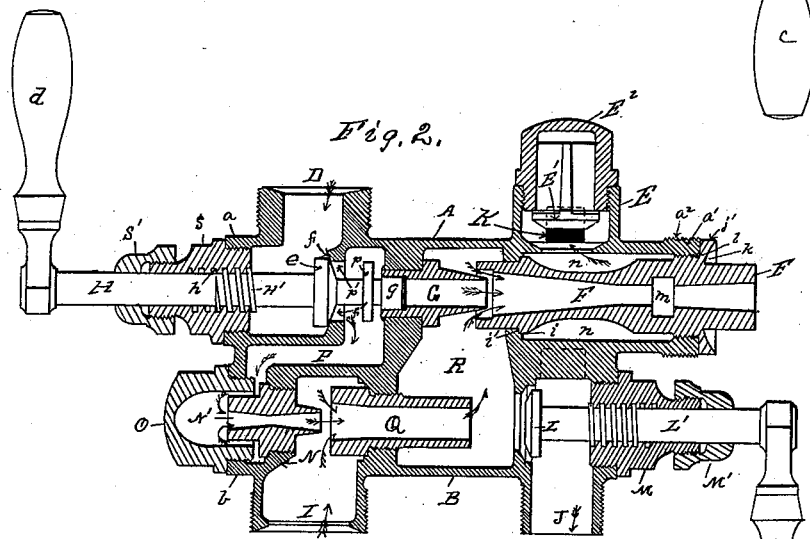
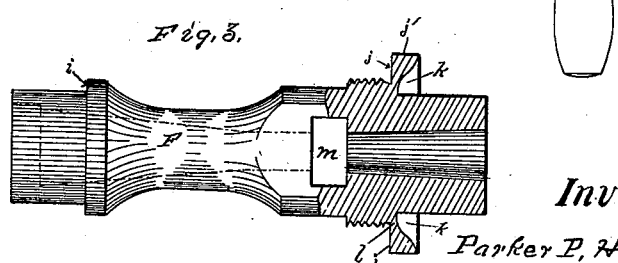
Witnesses.
G. J. Mead,
G. A. McDannell
Inventor.
Parker P. Hogue
By J. H. Sturgeon
Atty.

(Model.)

2 Sheets—Sheet 2.

P. P. HOGUE.
COMBINED EJECTOR AND INJECTOR.

No. 400,342.

Patented Mar. 26, 1889.

Witnesses.
G. J. Mead,
G. A. McDonnell

Inventor.
Parker P. Hogue,
By A. Stringroer
Atty

UNITED STATES PATENT OFFICE.

PARKER P. HOGUE, OF ERIE, PENNSYLVANIA.

COMBINED EJECTOR AND INJECTOR.

SPECIFICATION forming part of Letters Patent No. 400,342, dated March 26, 1889.

Application filed August 2, 1888. Serial No. 281,782. (Model.)

*To all whom it may concern:*

Be it known that I, PARKER P. HOGUE, a citizen of the United States, residing at Erie, in the county of Erie and State of Pennsylvania, have invented certain new and useful Improvements in Combined Ejectors and Injectors; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention consists in the improvements in combined ejectors and injectors hereinafter set forth and explained, and illustrated in the accompanying drawings, in which—

Figure 4:
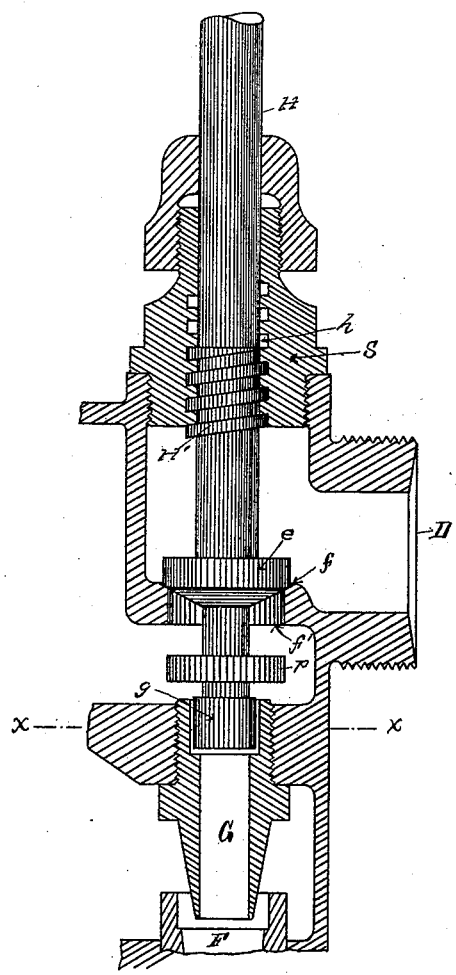
Figure 5:
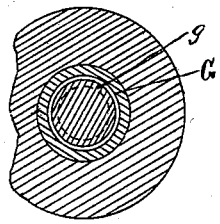

Figure 1 is a view in elevation of my improved combined ejector and injector. Fig. 2 is a central longitudinal section of the same. Fig. 3 is a view of the injecting-tube of same detached therefrom. Fig. 4 is an enlarged sectional view of the valve portion of my improved injector. Fig. 5 is a cross-section of the same on the line $x\,x$ in Fig. 4.

Like letters refer to like parts in all the figures.

The objects of my invention are, first, to so combine a combined ejector and injector that they may be operated by a single steam-inlet valve; second, to construct such combined ejector and injector with a check-valve adapted to automatically shut off the overflow when the injector commences to operate; third, to so construct a double-seated injecting-tube as to insure the perfect seating of same.

In constructing my device I preferably cast the body A of the injecting portion and the body B of the ejecting portion of the device in a solid piece, the two being connected together by a web, C, having steam and water passages cored out therein, as hereinafter described. At one side, and near the end $a$ of the injector-body A, I provide a steam-inlet opening, D, and near the opposite end, $a'$, thereof I place a check-valve, E', and in the end $a'$, I place my double-seated injecting-tube F, Fig. 3, so that it is directly in line with the jet-tube G and valve-stem H. In the ejector-body B, opposite the steam-inlet D, I make a water-supply opening, I, and opposite the check-valve E', I make an overflow-opening, J, connecting with the check-valve E' by means of curved passages K, cored out around the end $a'$ of the injector-body A, and also with the water-supply passage R by means of an overflow-valve, L, the stem L' of which passes out through a screw-threaded plug, M, and stuffing-box M', secured in the end $b'$ of the ejector-body B, where it is provided with an operating-handle, $c$. In a seat, N, in the inside of the ejector-body B, near the end $b$ thereof, I secure an ejecting jet-tube, N', the end $b$ of the ejector-body B being closed by means of a hollow screw cap or plug, O. From the steam-inlet D to the ejector jet-tube N', I make a steam-passage, P, through the web C, and from the water-inlet opening I an ejector-tube, Q, extends to and into a chamber and passage, R, which extends through the web C to the inner end of the injector-tube F, so that the ejector-tube Q will deliver water directly to the mouth of the injector-tube F. The end $a$ of the injector-body A is closed by a screw-plug, S, provided with a stuffing-box, S', through which the valve-stem H projects, the valve-stem H being provided with a projecting screw-thread, H', which operates in a thread, $h$, in the plug S, so that by turning the stem H by means of the handle $d$ the valve $e$ is opened and closed upon its seat $f$. The lower end, $g$, of the valve-stem H extends downward into the upper end of the injector jet-tube G and fits loosely therein, so as to permit the raising of the valve $e$ a short distance from its seat $f$, so as to admit steam to the ejector-tube N without admitting a full head of steam to the injector jet-tube G, until the water is raised into the injector, when by turning the handle $d$ farther around the piston-valve $g$ is entirely withdrawn from the jet-tube G, which brings the injector portion of the device fully into operation. The valve H is also provided with a second piston-valve, $p$, between the valve $e$ and the piston-valve $g$, so that by turning the handle $d$ farther around it can be moved up to or into the opening $f'$ under the valve-seat $f$, so as to regulate the volume of steam admitted through said opening, thereby relatively regulating the pressure exerted by the steam on both the ejector and injector at the same time.

The injector-tube F, Fig. 3, of my device I construct with two seating-surfaces, $i$ and $j$. In the outside of the flange $j'$, forming the seating-surface $j$, I make a recess, $k$, in such shape that the flange $j'$ is very thin at the point $l$ of its junction with the tube F. When this tube is placed in the shell A, the seat $i$ contacts with its seat $i'$ before the seat $j$ quite touches the end $a'$ of the shell A, so that when an ordinary flange union-nut (not shown) is screwed upon the thread $a^2$ on the end $a'$ of the shell A in coupling a nipple thereto the flange $j'$ is forced up against the end $a'$ of the shell A and perfectly seated thereon, so that both the seats $i$ and $j$ are perfectly tight. I also make in the tube F an overflow-opening, $m$, which communicates with the chamber $n$ between the tube F and the inside of the shell A, and thence through the check-valve E' with the curved passages K to the overflow exit-pipe J, the check-valve E operating to allow the overflow to escape until the injector starts, which then produces a suction that closes the check-valve E', in which position it remains as long as the injector continues to operate, unless the boiler foams, when it operates as a relief-valve.

In operation I first turn the handle $d$ about one-fourth of the way around, which raises the valve $e$ off of its seat and admits steam to the passage P, and thence to the ejector-tube N, which operates to raise water and fill the chamber R, when by turning the lever $d$ farther around the end $g$ of the valve-stem is withdrawn from the end of the injector jet-tube G, which permits the full head of steam to operate through the injector-tube F to force the water into the boiler.

Having thus fully described my invention, so as to enable others to make and use the same, what I claim as new, and desire to secure by Letters Patent of the United States, is—

1. The combination, in a combined ejector and injector having steam and water passages connecting them together, of a valve-stem, having a steam-inlet valve secured thereon and operating on a valve-seat, with a piston-valve secured on the end of said valve-stem, operating loosely in the end of injector-tube, substantially as and for the purpose set forth.

2. The combination, in an injector-tube, of a peripheral shoulder or flange on its inner end, adapted to fit tightly against a seat in the injector-body, with a flange on its outer end concaved out on one side, so as to adapt it to be forced up to and seated against the end of the injector-body, substantially as and for the purpose set forth.

3. The combination, in an injector valve-stem, of a steam-shut-off valve operating upon a seat and a piston-valve operating in the end of the injector jet-tube, with a valve on said stem between said first-named valves adapted to regulate the flow of steam, substantially as and for the purpose set forth.

In testimony whereof I affix my signature in presence of two witnesses.

PARKER P. HOGUE.

Witnesses:
WM. P. HAYES,
H. C. STAFFORD.